United States Patent
Chiang

(10) Patent No.: US 9,009,919 B1
(45) Date of Patent: Apr. 21, 2015

(54) STEADY OPENING AND CLOSING DOUBLE-AXIS HINGE

(71) Applicant: Sinher Technology Inc., New Taipei (TW)

(72) Inventor: Yung-Chang Chiang, New Taipei (TW)

(73) Assignee: Sinher Technology Inc., New Taipei (TW)

( * ) Notice: Subject to any disclaimer, the term of this patent is extended or adjusted under 35 U.S.C. 154(b) by 19 days.

(21) Appl. No.: 14/087,593

(22) Filed: Nov. 22, 2013

(51) Int. Cl.
*E05D 7/00* (2006.01)
*E05D 11/08* (2006.01)
*H05K 5/02* (2006.01)
*E05D 3/12* (2006.01)

(52) U.S. Cl.
CPC .............. *H05K 5/0226* (2013.01); *E05D 3/12* (2013.01); *E05D 11/082* (2013.01)

(58) Field of Classification Search
CPC ............... E05D 3/12; E05D 3/06; E05D 3/10; G06F 1/1681; G06F 1/1616; G06F 1/1618; E05Y 2900/606; H04M 1/0216; H04M 1/0222; H04M 1/022; H05K 5/0226
USPC .......... 16/366, 368, 369, 340, 337, 334, 389, 16/357, 360, 361, 342, 330, 303; 361/679.6, 679.9, 679.17, 679.27; 248/917–923, 284.1; 379/433.12, 379/433.13; 455/575.1, 575.3, 575.4, 455/550.1, 90.3; 348/333.06, 373, 794
See application file for complete search history.

(56) References Cited

U.S. PATENT DOCUMENTS

| | | | |
|---|---|---|---|
| 6,779,234 B1 * | 8/2004 | Lu et al. | 16/340 |
| 7,484,269 B2 * | 2/2009 | Chih et al. | 16/340 |
| 8,385,991 B2 * | 2/2013 | Wang et al. | 455/575.3 |
| 8,776,319 B1 * | 7/2014 | Chang et al. | 16/366 |
| 8,914,946 B2 * | 12/2014 | Hsu et al. | 16/366 |
| 2007/0039132 A1 * | 2/2007 | Jung et al. | 16/325 |
| 2009/0000062 A1 * | 1/2009 | Yamanami | 16/366 |
| 2009/0070961 A1 * | 3/2009 | Chung et al. | 16/354 |
| 2011/0265288 A1 * | 11/2011 | Chiang | 16/341 |
| 2011/0289726 A1 * | 12/2011 | Zhang et al. | 16/250 |
| 2013/0111704 A1 * | 5/2013 | Mitsui | 16/250 |
| 2013/0135809 A1 | 5/2013 | Uchiyama et al. | |
| 2013/0318746 A1 * | 12/2013 | Kuramochi | 16/342 |

FOREIGN PATENT DOCUMENTS

| | | |
|---|---|---|
| CN | 202484069 U | 10/2012 |
| JP | 5112121 B2 | 10/2012 |
| TW | M433709 U1 | 7/2012 |

(Continued)

*Primary Examiner* — Chuck Mah
(74) *Attorney, Agent, or Firm* — Muncy, Geissler, Olds & Lowe, P.C.

(57) ABSTRACT

A steady opening and closing double-axis hinge comprises a first rotation member, a second rotation member and a connection member run through by the first rotation member and the second rotation member in a parallel manner. The first rotation member includes a first shaft and a first sector portion formed on the first shaft. The second rotation member includes a second shaft and a second sector portion formed on the second shaft. The connection member includes a movable detent plate which is located between the first and second shafts and movable between a first operation position and a second operation position. Through the movement of the movable detent plate, the first sector portion and second sector portion can be blocked alternately to control the first and second shafts to rotate in sequence, so as to simplify the shaft rotation switch mechanism and improve the durability.

7 Claims, 6 Drawing Sheets

(56) References Cited

FOREIGN PATENT DOCUMENTS

| TW | M438797 | U1 | 10/2012 |
| TW | M441303 | U1 | 11/2012 |
| TW | M442005 | U1 | 11/2012 |
| TW | M452593 | U1 | 5/2013 |
| TW | 201326589 | A1 | 7/2013 |
| TW | 201326590 | A1 | 7/2013 |

* cited by examiner

STEADY OPENING AND CLOSING DOUBLE-AXIS HINGE

FIELD OF THE INVENTION

The present invention relates to a double-axis hinge and particularly to a steady opening and closing double-axis hinge.

BACKGROUND OF THE INVENTION

A conventional flip electronic device such as a notebook computer, mobile phone or the like generally has a hinge to couple a display and a body to allow the display to be opened or closed against the body, and also provide torsional force to support and anchor the display at a desired angle after being opened. In the past the hinge usually was a single-axis hinge with only one shaft as an axis. Although the single-axis hinge allows the display to be opened against the body, the display and body interfere each other after the display has been opened at a certain angle and cannot be opened continuously to greater angle, hence a range of open angles of the electronic device is limited. Nowadays touchable electronic devices equipped with a keyboard and a touch screen is very fashionable. Aside from using the keyboard to do input as usual, flipping and stacking the touch screen and keyboard-attached body inversely to input in a touch mode also is a commonly required function. As a result, the conventional single-axis hinge can no longer meet the requirement of present market.

To overcome the flaws of the conventional single-axis hinge, a double-axis hinge capable of rotating to a greater angle has been developed, such as Taiwan patent No. M433709 which discloses a double-axis hinge that comprises a shaft holder, a first shaft and a second shaft disposed in the shaft holder, friction plates penetrated by the first and second shafts to provide frictional forces and fixed friction plates connected to the first and second shafts to rub with the friction plates. The first and second shafts can respectively rotate relative to the shaft holder, and can be installed respectively on a first device body (such as a display) and a second device body (such as a device body) of an electronic device, so as to allow the first device body to rotate against the second device body, and at maximum the first device body can be flipped to the backside of the second device body. While the M433709 double-axis hinge can meet the requirement of a touchable electronic device needed to be opened to a greater angle by flipping, the first and second shafts do not have a mechanism to rotate alternately. Its two shafts could rotate simultaneously. As a result, when the display rotates against the device body, the relative positions of the shaft holder and the device body could also change to make the display tilting backward and give users unsteady feeling when in use.

To resolve to aforesaid disadvantage, producers have developed double-axis hinges capable of rotating in sequence, such as Taiwan patent Nos. M438797, M441303, M442005 and M452593 disclosed. Each of those double-axis hinges generally include a first shaft and a second shaft parallel with each other, a first latch cam and a second latch cam coupled respectively on the first shaft and the second shaft, and a first connection plate and a second connection plate disposed at two sides of the first and second latch cams and run through by the first and second shafts. The first latch cam has a first recess on the perimeter thereof, and the second latch cam has at least one second recess on the perimeter thereof. The first connection plate and second connection plate are interposed by a roller which is disposed between the first and second latched cams and can be movably wedged in the first or second recesses, thereby to switch rotation of the first shaft and the second shaft. In addition, the first and second shafts have respectively a detent portion, and the first connection plate has barriers to block the detent portions to confine rotation of the first and second shafts. On the other hand, Japan patent No. JP5112121 also discloses a dual-axis hinge which comprises a hinge case, a first shaft and a second shaft parallel with each other and run through the hinge case, a first cam and a second cam respectively pierced through by the first shaft and second shaft, a first driven member and a second driven member located between the first and second shafts and being in contact respectively with the first and second cams, and an elastic unit located between the first and second driven members to provide a thrust force. The first cam and the second cam have respectively a plurality of recesses, while the first and second driven members have respectively a boss to latch the recesses. The elastic unit pushes the first and second driven members to latch the boss on the recesses to switch rotations of the first shaft and second shaft. In addition, the first and second shafts also penetrate respectively through a first rotation retainer and a second rotation retainer that can latch respectively on a first rotation restriction portion and a second rotation restriction portion formed on the hinge case to restrict rotations of the first and second shafts. Although the aforesaid double-axis hinges can make the first and second shafts rotate sequentially to maintain stabilities during opening or closing, their structures are complex and have to collaborate with a great number of components during assembly and installation. As a result, they have disadvantages such as complicated production process, difficult assembly and higher fabrication costs.

In recent years some producers have developed a simpler double-axis hinge that can rotate in sequence, such as China patent No. CN202484069 and U.S. patent publication No. US2013/0135809. They all disclose a hinge device which includes a hinge bracket, a first axis and a second axis that are parallel with each other and rotatablely supported by the hinge bracket, and a floating locating member which is supported by the hinge bracket and able to slide between the first and second axes. The first and second axes have respectively a first recess and a second recess. The floating locating member can be coupled respectively to the first recess and second recess to make the first and second axes to rotate sequentially. Further, each of the first and second axes also forms a protrusion, and the hinge bracket has stop parts corresponding to the protrusions to stop rotation of the first and second axes at a preset angle. In addition, Taiwan patent publication Nos. 201326589 and 201326590 also disclose a lock type dual axis hinge which includes a connecting frame, a first rotation shaft and a second rotation shaft being pivoted to the connection frame side by side, and a first latch recess and a second latch recess formed respectively on the first rotation shaft and second rotation shaft. The connection frame has a holding aperture located between the first and second latch recesses to hold a floating member which is engage respectively with the first latch recess and second latch recess to allow the first rotation shaft and the second rotation shaft to rotate in sequence. The floating member can be a pin with two spherical ends or two rolling balls. The first and second rotation shafts further respectively through a first detent plate and a second detent plate, and the connection frame includes a first barrier and a second barrier to block the first and second detent plates to confine the rotation angles of the first and second rotation shafts.

The hinge devices and the lock type dual axis hinges in the aforesaid CN202484069 and US2013/0135809, and Taiwan 201326589 and 201326590 have simpler structures, but shapes of their components are complicated which generates serious tolerance problems. For instance, in the hinge devices disclosed in CN202484069 and US2013/0135809, the first and second recesses are formed in an arched shape, hence fabrication thereof is more difficult and the problem of machining tolerances easily occurs that could decrease degree of precision. In Taiwan 201326589 and 201326590, the parts of the floating member which contacts with the rotation shafts and the latch recesses are arched tangent surfaces formed axially on the floating member. Thus, fabrication of the floating member also is difficult and costly, and precision of the finished product is hard to control. Moreover, when the floating member latches on the latch recess they merely contact in a small area and form an unstable butting relationship. Hence the surface of the latch recess cannot firmly push the floating member. As a result, when the floating member escapes the latch recess wobbling or movement interruption easily occurs. In addition, the floating member also contacts with and butts the rotation shaft in a small area, therefore the uneven applied force or local wearing could happen to generate deformation of the floating member. Hence the aforesaid hinge devices and the lock type dual axis hinges not only have components formed in complicated shapes that results in higher production costs and lower precision, also have unstable contact between the floating member and axis or unsecure latch relationship between the floating ember and the recess that could cause unsmooth movement of the floating member to result a unstable operation of opening or closing and a undesirable operation feel.

SUMMARY OF THE INVENTION

The primary object of the present invention is to provide a double-axis hinge that can be opened and closed smoothly and steadily and able to switch the order of rotation.

Another object of the invention is to provide a double-axis hinge with a simplified structure to facilitate fabrication.

To achieve the foregoing objects the present invention provides a steady opening and closing double-axis hinge that comprises a first rotation member, a second rotation member and a connection member run through by the first and second rotation members. The first rotation member includes a first shaft and a first assembly portion connected to the first shaft. The first shaft includes a first sector portion and a first barrier portion located at one end of the first sector portion. The second rotation member includes a second shaft and a second assembly portion connected to the second shaft. The second shaft includes a second sector portion and a second barrier portion located at one end of the second sector portion. The connection member includes a movable detent plate located between the first and second shafts. The movable detent plate includes a first recess corresponding to the first sector portion and a second recess corresponding to the second sector portion, and also includes a first operation position to abut against the second barrier portion and allow the first sector portion to pass through the first recess and make the first shaft rotate, and a second operation position to abut against the first barrier portion and allow the second sector portion to pass through the second recess to make the second shaft rotate.

In one embodiment the connection member includes a confining portion which includes a confining space to hold and confine the movable detent plate to move between the first operation position and second operation position.

In another embodiment the movable detent plate includes a first butting portion abutted by the first barrier portion to push the movable detent plate to switch from the second operation position to the first operation position, and a second butting portion abutted by the second barrier portion to push the movable detent plate to switch from the first operation position to the second operation position.

In yet, another embodiment the connection member includes a first hole run through by the first shaft and a second hole run through by the second shaft.

In yet another embodiment the first sector portion includes a first retaining portion at another end opposite to the first barrier portion, and the connection member includes a first detent portion to block the first retaining portion or first barrier portion to restrict the first shaft from rotating.

In yet another embodiment the second sector portion includes a second retaining portion at another end opposite to the second barrier portion, and the connection member includes a second detent portion to block the second retaining portion or second barrier portion to restrict the second shaft from rotating.

In yet another embodiment the first rotation member includes a first torsion generation mechanism run through by the first shaft to provide torsional force for the first rotation member to rotate, and the second rotation member includes a second torsion generation mechanism run through by the second shaft to provide the torsional force for the second rotation member to rotate.

The double-axis hinge of the invention thus formed provides features as follows: the first and second shafts include respectively a first sector portion and a second sector portion formed thereon, and the connection member includes the movable detent plate to block respectively the first and second sector portions so that the shafts can rotate in sequence as desired. It provides a simpler structure than that of the conventional double-axis hinges and can be produced on the existing production line of the conventional double-axis hinges by making merely a small change. Hence its costs of development and production can be reduced. In addition, the movable detent plate includes the first and second recesses corresponding respectively to the first and second sector portions to provide support the first and second sector portions securely without wobbling caused by uneven applied forces. Moreover, the movable detent plate includes butting portions corresponding to the barrier portions, thus can be pushed steadily by forces to move smoothly. As a result, the double-axis hinge of the invention can provide steady and smooth opening and closing movements as desired. Furthermore, the components of the double-axis hinge of the invention are simpler in shapes, hence can be fabricated at a higher precision without the serious tolerance problem occurred to the conventional techniques.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENT

Figure 1:
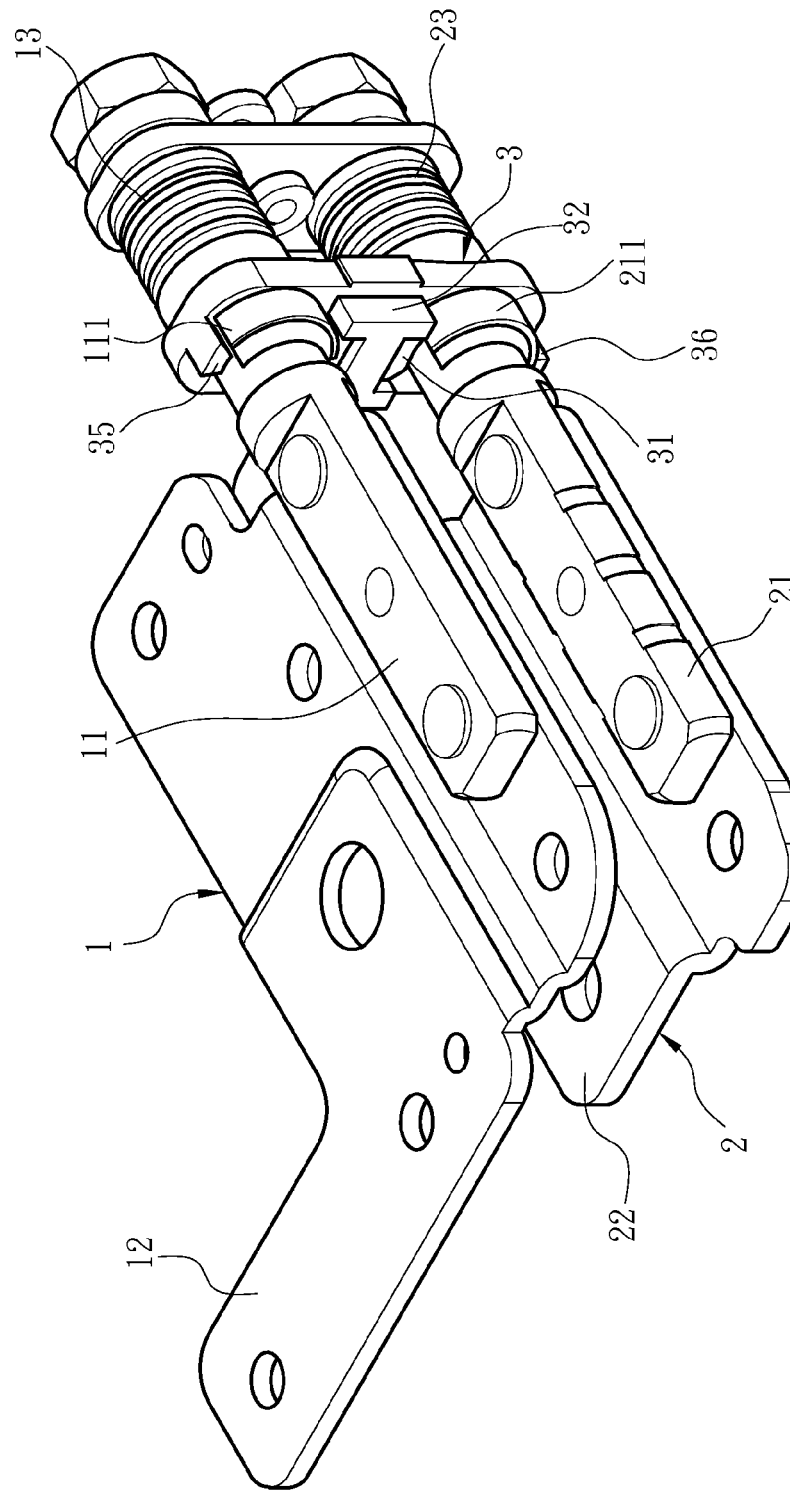
FIG. 1 is a perspective view of the steady opening and closing double-axis hinge of the invention.
Figure 2:
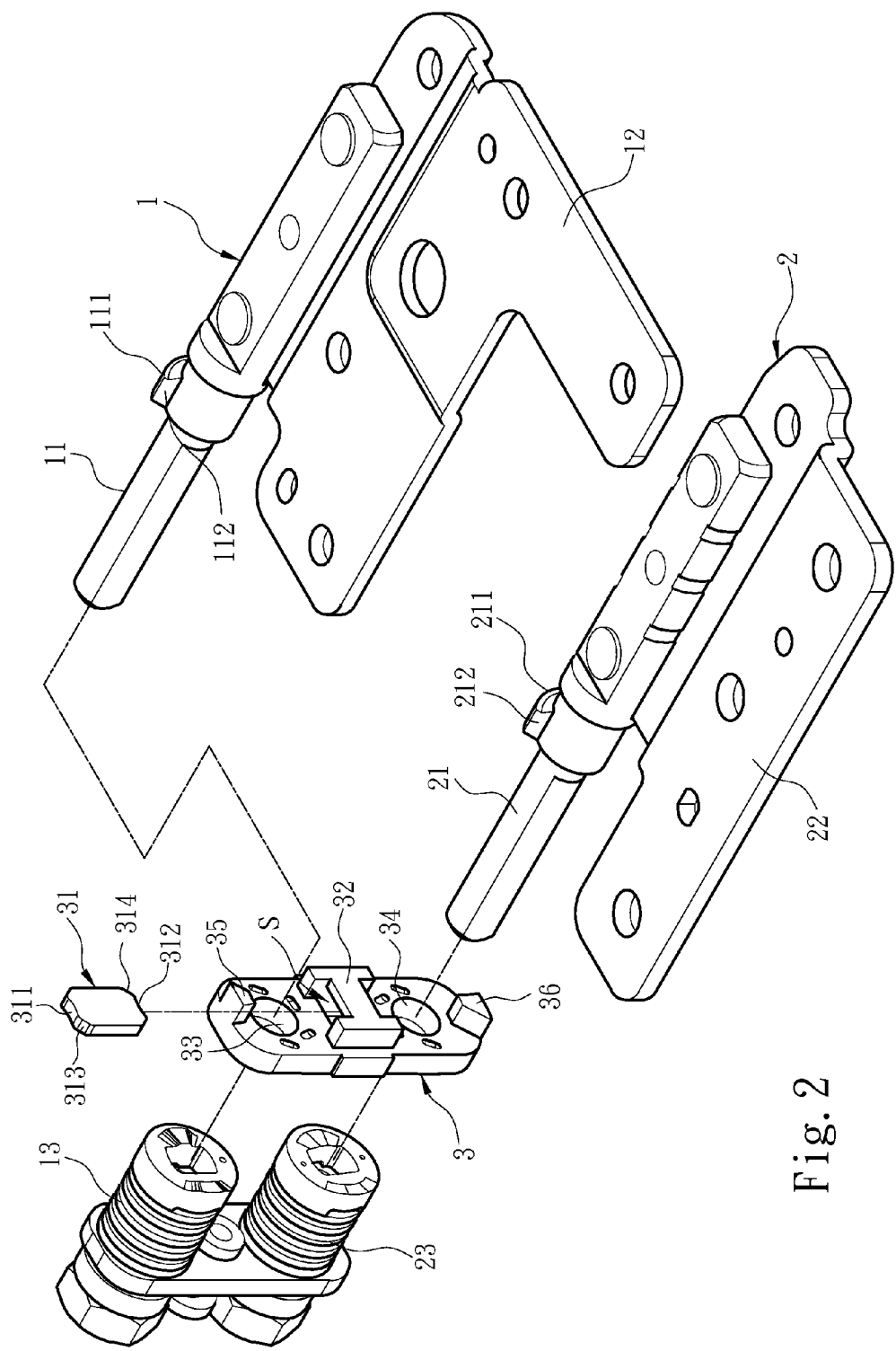
FIG. 2 is an exploded view of the steady opening and closing double-axis hinge of the invention.

Please refer to FIGS. 1 and 2, the present invention aims to provide a steady opening and closing double-axis hinge to couple a display (not shown in the drawings) and a body (also not shown in the drawings) of a flip electronic device. The invention comprises a first rotation member 1, a second rotation member 2 and a connection member 3 run through by the first and second rotation members 1 and 2. The first rotation member 1 includes a first shaft 11, a first assembly portion 12 connected to the first shaft 11 and fastened on the display, and a first torsion generation mechanism 13 run through by the first shaft 11 to provide torsional force. The second rotation member 2 includes a second shaft 21, a second assembly portion 22 connected to the second shaft 21 and fastened on the body, and a second torsion generation mechanism 23 run through by the second shaft 21 to provide the torsional force. Also referring to FIG. 3A, the first shaft 11 includes a first sector portion 111 protruding radially therefrom, a first barrier portion 112 located at one end of the first sector portion 111, and a first retaining portion 113 located at another end of the first sector portion 111 opposite to the first barrier portion 112. The second shaft 21 includes a second sector portion 211 protruding radially therefrom, a second barrier portion 212 located at one end of the second sector portion 211, and a second retaining portion 213 located at another end of the second sector portion 211 opposite to the second barrier portion 212. Preferably, the first and second barrier portions 112 and 212 are formed respectively in an inclined surface crossed with tangent surfaces of the first and second shafts 11 and 21 at a specific angle. The first and second retaining portions 113 and 213 are preferably formed in a vertical surface perpendicular to the tangent surfaces of the first and second shafts 11 and 21. In addition, the first sector portion 111 can be directly and integrally formed on the first shaft 11, and the second sector portion 21 also can be directly and integrally formed on the second shaft 21.

The connection member 3 aims to couple the first and second shafts 11 and 21, and includes a first hole 33 run through by the first shaft 11, a second hole 34 run through by the second shaft 21, a movable detent plate 31 disposed between the first and second shafts 11 and 21, and a confining portion 32 to encase and confine the movable detent plate 31 to move between the first and second shafts 11 and 21. As shown in FIG. 2, the movable detent plate 31 includes a first recess 311 formed at one end thereof and corresponding to the shape of the first sector portion 111, a first butting portion 313 corresponding to the first barrier portion 112 and abutting the first recess 311, a second recess 312 formed at another end thereof and corresponding to the shape of the second sector portion 211, and a second butting portion 314 corresponding to the second barrier portion 212 and abutting the second recess 312. The confining portion 32 is disposed on the surface of the connection member 3 and hollow inside to form a confining space S to hold the movable detent plate 31. The confining space S is open towards the first and second shafts 11 and 21 so that the movable detent plate 31 can move smoothly in the confining space S along a direction towards the first and second shafts 11 and 21. For assembly, first, place the movable detent plate 31 in the confining space S; next, insert the first and second shafts 11 and 12 respectively into the first and second holes 33 and 34 in a parallel manner until the first and second sector portions 111 and 211 reaching the connection member 3. Therefore the movable detent plate 31 is clamped between the first sector portion 111 and second shaft 21 (or between the first shaft 11 and second sector portion 211) and the assembly process is finished. Through such structure the first and second shafts 11 and 21 are securely supported by the connection member 3 and can be rotated steadily relative to the connection member 3.

In addition, as shown in FIG. 2, the connection member 3 further includes a first detent portion 35 and a second detent portion 36 corresponding respectively to the first sector portion 111 and the second sector portion 211. The first detent portion 35 and the second detent portion 36 can be directly and integrally formed on the connection member 3. When the first shaft 11 is rotated until the first barrier portion 112 or the first retaining portion 113 is blocked by the first detent portion 35, the first shaft 11 is restricted from rotating continuously. Similarly, when the second shaft 21 is rotated until the second barrier portion 212 or the second retaining portion 213 is blocked by the second detent portion 36, the second shaft 21 is restricted from rotating continuously. Through the first and second detent portions 35 and 36 rotation of the first shaft 11 or the second shaft 21 can be confined at a selected range of angles.

Figure 3A:
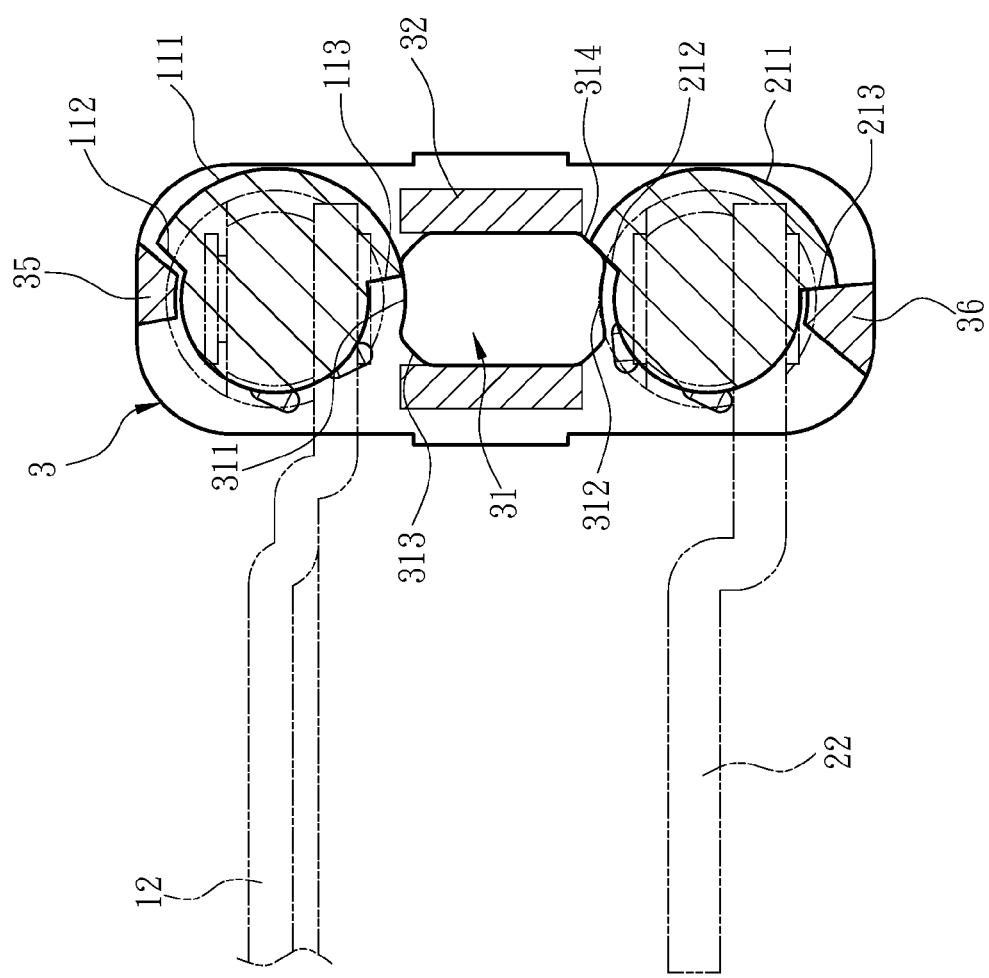
FIG. 3A is a schematic view showing the double-axis hinge of the invention in a closing condition at 0 degree.
Figure 3B:
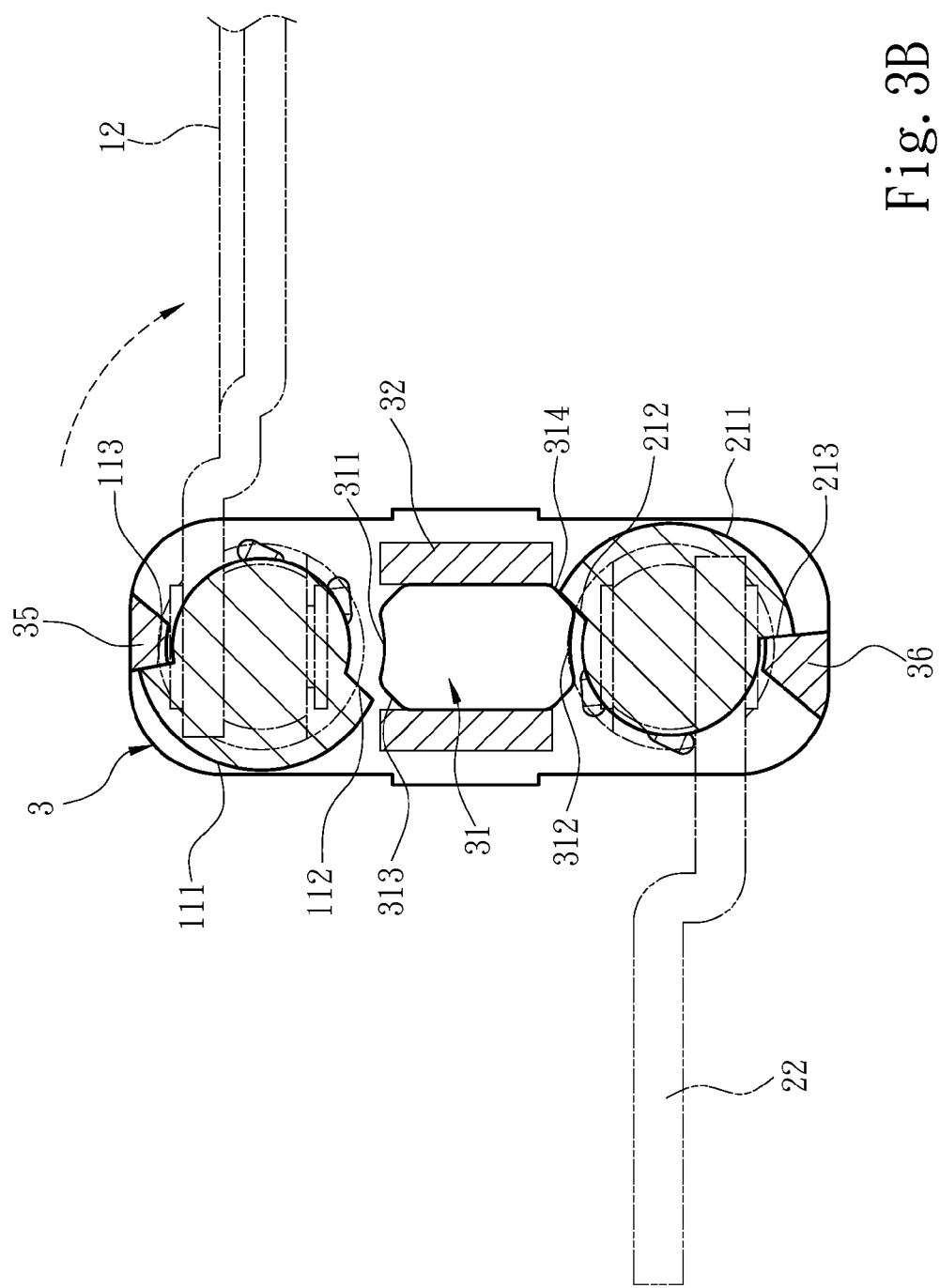
FIG. 3B is a schematic view of the invention when the first shaft opens to 180 degrees.
Figure 3C:
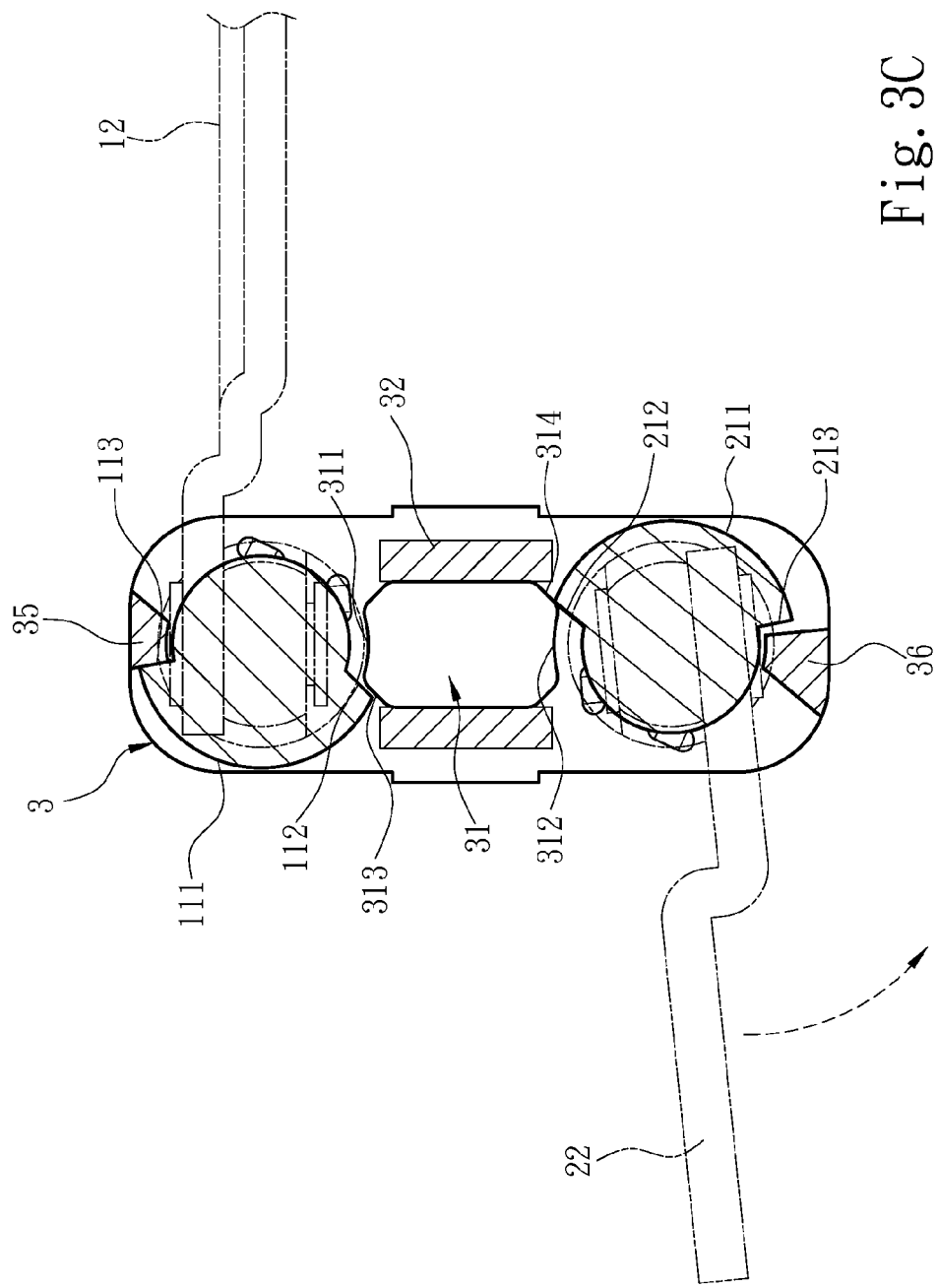
FIG. 3C is a schematic view of the invention when the second shaft opens to 10 degrees.
Figure 3D:
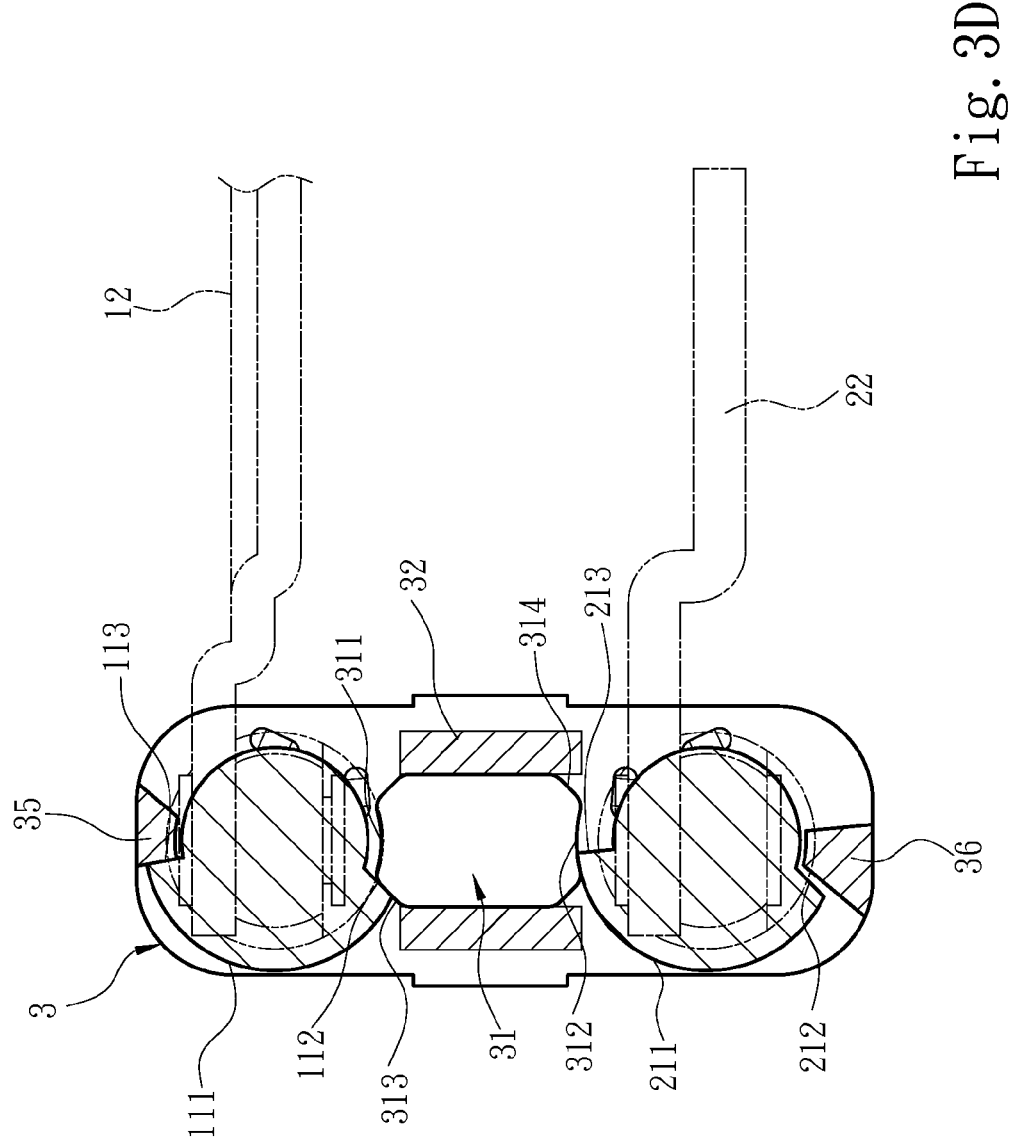
FIG. 3D is a schematic view of the invention when the second shaft opens to 180 degrees.

It is to be noted that the movable detent plate 31 is movable in the confining space S and includes a first operation position and a second operation position. Please refer to FIGS. 3A through 3D showing various opening conditions of the double-axis hinge of the invention at different angles. FIG. 3A depicts the invention in a closing condition at an angle of 0 degree (equivalent to the display of the electronic device being closed and folded over the body). At first, the movable detent plate 31 at the first operation position is pushed by the first sector portion 111 to abut the second barrier portion 212 so that the rotation of first shaft 11 is allowed but that of the second shaft 21 is restricted. More specifically, at the first operation position the movement detent plate 31 is pushed by the first sector portion 111 and the second butting portion 314 thereof abuts the second barrier portion 212 of the second shaft 21. Meanwhile, the second retaining portion 213 is blocked by the second detent portion 36 so that the second shaft 21 cannot rotate. When a user applies force to open the display, the first shaft 11 is driven to rotate, and the first sector portion 111 can pass the first recess 311 without restriction. Due to the shape of the first recess 311 corresponds to the first sector portion 111, the force applied by the first sector portion 111 can be evenly and steadily born without generating local wearing. In the meantime, the movable detent plate 31 is still pushed by the first sector portion 111 and fixed at the first operation position to restrict the second shaft 21 from rotating. After the first shaft 11 has been rotated for 180 degrees (i.e., the display is flipped relative to the body for 180 degrees), the first retaining portion 113 is blocked by the first detent portion 35 so that the first shaft 11 is restricted from rotating continuously. Meanwhile, the first sector portion 111 disengages from the first recess 311, and the first barrier portion 112 is rotated to a position corresponding to the first butting portion 313 of the movable detent plate 31 (as shown in FIG. 3B), then a interval in which the movable detent plate 31 can move is formed. Then, another force is applied to the second assembly portion 22 (i.e. to the body of the electronic device), and the second barrier portion 212 is driven to push the second butting portion 314 of the movable detent plate 31 (as shown in FIG. 3C). As the second barrier portion 212 and second butting portion 314 are inclined surfaces, the push force of the second barrier portion 212 generates an upward force to push the second butting portion 314 to slide upward along the inclined surface, consequentially the movable detent plate 31 is pushed to move towards the first shaft 11. Due to the second barrier portion 212 and second butting portion 314 are disposed corresponding to each other, the second barrier portion 212 can steadily apply force to the second butting portion 314 to make the movable detent plate 31 move smoothly and steadily. When the first butting portion 313 reaches and is blocked by the first barrier portion 112, the movable detent plate 31 is at the second operation position and pressed by the second sector portion 211 to abut the first barrier portion 112. In the meantime, the second sector portion 211 can pass through the second recess 312 without restriction, therefore rotation of the second shaft 21 is allowed while that of the first shaft 11 is restricted. Similarly, due to the second recess 312 is formed in a shape corresponding to the second sector portion 211, the force applied by the second sector portion 211 can be evenly and steadily born without generating local wearing. Through the operation previously discussed, the second shaft 21 can be rotated continuously for 180 degrees to make total opening angle to 360 degrees as shown in FIG. 3D (i.e., with the display flipped inversely over the body).

When to close the display over the body again, just reverse the operation previously discussed. First, rotate the second shaft 21 in the opposite direction for 180 degrees until the second retaining portion 213 is blocked by the second detent portion 36. In the meantime the second sector portion 211 disengaged from the second recess 312, and the second barrier portion 212 is rotated to a position corresponding to the second butting portion 314 of the movable detent plate 31 to form an interval for the movable detent plate 31 to move therein. Next, rotate the first shaft 11 reversely to make the first barrier portion 112 abut the first butting portion 313. As the first barrier portion 112 and first butting portion 313 are inclined surfaces, the push force of the first barrier portion 112 generates a downward force to make the first butting portion 313 to be pushed and slide downward along the inclined surface, so that the movable detent plate 31 is pushed from the second operation position to the first operation position (referring to FIG. 3B). Since the first barrier portion 112 and first butting portion 313 are disposed corresponding to each other, the first barrier portion 112 can steadily apply force to the first butting portion 313 to make the movable detent plate 31 move smoothly and steadily. When the movable detent plate 31 is pushed back to the first operation position it is pressed again by the first sector portion 111 to abut the second barrier portion 212 and restrict the second shaft 21 from rotating, thereby the first shaft 11 can continuously rotate for 180 degrees and return to the initial closed condition at 0 degree (as shown in FIG. 3A).

As a conclusion, the steady opening and closing double-axis hinge of the invention includes the first sector portion and the second sector portion formed respectively on the first and second shafts, and the movable detent plate formed on the connection member to block movement of the first and second sector portions so that the shafts can be rotated in sequence. It has a simpler structure than the conventional double-axis hinges, hence can be fabricated and assembled faster to increase production efficiency and reduce production cost. Besides, the present invention provides improvement over the existing techniques and is adaptable on the existing production facilities for production after small modified, thus research and development cost can be greatly reduced. In addition, the first and second recesses of the movable detent plate are formed in shapes corresponding to the first and second sector portions, hence can steadily support the first and second sector portions without generating uneven forces or wobbling. Furthermore, the butting portions of the movable detent plate also correspond to the barrier portions of the sector portions, hence the movable detent plate can be steadily pushed by the sector portion and move smoothly to make opening and closing operation of the double-axis hinge even more smoothly and steadily. Finally, the components of the double-axis hinge of the invention are formed in simple shapes, hence also are easier to fabricate. Comparing with the conventional techniques, the components of the present invention can prevent serious tolerance problem cause by complicated shapes and have higher precision.

What is claimed is:

1. A steady opening and closing double-axis hinge, comprising:
    a first rotation member including a first shaft and a first assembly portion connected to the first shaft, the first shaft including a first sector portion and a first barrier portion located at one end of the first sector portion;
    a second rotation member including a second shaft and a second assembly portion connected to the second shaft, the second shaft including a second sector portion and a second barrier portion located at one end of the second sector portion; and
    a connection member which rotatably holds the first shaft and the second shaft in a parallel manner and includes a movable detent plate located between the first shaft and the second shaft, the movable detent plate including a first recess corresponding to the first sector portion and a second recess corresponding to the second sector portion, and said detent plate being movable between a first operation position to abut against the second barrier portion and allow the first sector portion to pass through the first recess to make the first shaft rotatable with respect to the connection member, and a second operation position to abut against the first barrier portion and allow the second sector portion to pass through the second recess to make the second shaft rotatable with respect to the connection member.

2. The steady opening and closing double-axis hinge of claim 1, wherein the connection member includes a confining portion which includes a confining space to hold and confine the movable detent plate to move between the first operation position and the second operation position.

3. The steady opening and closing double-axis hinge of claim 1, wherein the movable detent plate includes a first butting portion abutted by the first barrier portion to push the movable detent plate to switch from the second operation position to the first operation position, and a second butting portion abutted by the second barrier portion to push the movable detent plate to switch from the first operation position to the second operation position.

4. The steady opening and closing double-axis hinge of claim 1, wherein the connection member includes a first hole rotatable holding the first shaft and a second hole rotatable holding the second shaft.

5. The steady opening and closing double-axis hinge of claim 1, wherein the first sector portion includes a first retaining portion at another end opposite to the first barrier portion, and the connection member includes a first detent portion to block the first retaining portion or the first barrier portion to restrict the first shaft from rotating.

6. The steady opening and closing double-axis hinge of claim 1, wherein the second sector portion includes a second retaining portion at another end opposite to the second barrier portion, and the connection member includes a second detent portion to block the second retaining portion or the second barrier portion to restrict the second shaft from rotating.

7. The steady opening and closing double-axis hinge of claim 1, wherein the first rotation member includes a first torsion generation mechanism which is run through by the first shaft and provides torsional force for the first rotation member to rotate, and the second rotation member includes a second torsion generation mechanism which is run through by the second shaft and provides the torsional force for the second rotation member to rotate.

* * * * *